(12) United States Patent
Davis (10) Patent No.: US 7,194,812 B2
(45) Date of Patent: Mar. 27, 2007

(54) LASER MARKING DEVICE FOR SERIAL I-JOIST CUTOUTS

(76) Inventor: John D. Davis, 7633 Raven Hills Dr., Las Vegas, NV (US) 89149

( * ) Notice: Subject to any disclaimer, the term of this patent is extended or adjusted under 35 U.S.C. 154(b) by 0 days.

(21) Appl. No.: 11/106,056

(22) Filed: Apr. 13, 2005

(65) Prior Publication Data

US 2005/0223572 A1 Oct. 13, 2005

Related U.S. Application Data

(60) Provisional application No. 60/561,992, filed on Apr. 13, 2004.

(51) Int. Cl.
*G01C 15/00* (2006.01)

(52) U.S. Cl. .............................. 33/286; 33/412; 33/529

(58) Field of Classification Search ................ 033/286, 033/DIG. 21, 1 G, 412, 529
See application file for complete search history.

(56) References Cited

U.S. PATENT DOCUMENTS

| | | | |
|---|---|---|---|
| 5,629,767 A | 5/1997 | Tchejeyan | |
| 5,754,582 A | 5/1998 | Dong | |
| 5,914,778 A | 6/1999 | Dong | |
| 5,999,346 A | 12/1999 | Grundstrom et al. | |
| 6,043,879 A | 3/2000 | Dong | |
| 6,124,586 A | 9/2000 | De Coi | |
| 6,170,163 B1 | 1/2001 | Bordignon et al. | |
| 6,172,758 B1 | 1/2001 | Livingston | |
| 6,371,626 B1* | 4/2002 | Addona | ................. 33/DIG. 21 |
| 6,375,395 B1 | 4/2002 | Heintzeman | |
| 6,532,676 B2 | 3/2003 | Cunningham | |
| 6,823,600 B1* | 11/2004 | Vaughan | ....................... 33/412 |
| 6,857,193 B2* | 2/2005 | Kallesen et al. | ............... 33/286 |
| 2002/0062570 A1* | 5/2002 | Palumbo et al. | ............... 33/286 |
| 2003/0164078 A1 | 9/2003 | Hiland, Jr. | |
| 2004/0045178 A1* | 3/2004 | Dameron | ....................... 33/286 |
| 2005/0060901 A1* | 3/2005 | Cook | ............................ 33/286 |

* cited by examiner

*Primary Examiner*—Christopher W. Fulton
(74) *Attorney, Agent, or Firm*—Johannes Schneeberger (57) ABSTRACT

A laser marking device includes a fixture for temporarily attaching the device in an initial cutout of a number of serial cutouts to be fabricated in adjacent assembled I-joists. Combined with the fixture is an angle gage that provides angular positioning of a marking laser. The angle gage is configured to hold the laser with its beam coinciding with the marking origin of the initial cutout, which in case of circular cutout may be the reference center at which the pilot drill of the hole saw is centered at the begin of the cutout operation. The marker laser may be horizontally and/or vertically oriented together with an eventual alignment laser and an eventual target marker temporarily affixed on the I-joist where a final reference point is determined for an axial orientation of the cutouts across the I-joists.

6 Claims, 11 Drawing Sheets

LASER MARKING DEVICE FOR SERIAL I-JOIST CUTOUTS

PRIORITY CLAIM

The present Application claims priority to U.S. Provisional Application of the same title and inventor, application Ser. No. 60/561,992, filed Apr. 13, 2004, which is hereby incorporated by reference.

CROSS REFERENCE

The present invention cross references and incorporates by reference U.S. Pat. No. 6,857,831, filed Feb. 27, 2004, titled "I-joist Hole Cutting Apparatus".

FIELD OF INVENTION

The present invention relates to laser marking devices in architectural construction. More particular, the present invention relates to laser marking devices for serial I-joist cutouts.

BACKGROUND OF THE INVENTION

During an architectural construction process, serial cutouts need to be fabricated by construction workers into a number of adjacent assembled I-joists to provide spacing and support for piping, tubing, cabling and the like across the I-joists' web portions. In particular, wooden hoists are assembled in architectural constructions in large numbers with small spacing, which requires a multitude of measurement operations and lengthy preparation. The use of a hole cutting apparatus such as the one described in the cross referenced patent, require merely a central reference point at which a pilot drill of the hole cutting apparatus is centered at the begin of the cutting operation. With conventional laser levels well known in the construction business, the marking of all the individual reference points is difficult since the laser beam may propagate only beneath or above the I-joists. Therefore, there exists a need for a specialized laser marking device for serially fabricating cutouts into adjacent assembled I-joists. The present invention addresses this need.

SUMMARY

A laser marking device is provided for marking reference points of a number of cutouts consecutively fabricated into a number of adjacent assembled I-joists at an architectural construction site. The laser marking device includes a fixture with which the device may be temporarily affixed at an initial cutout of a first I-joist. Combined with the fixture may be a centering feature that provides a centering of a horizontal and/or a vertical angle gage along which a laser holder and its laser may be brought into desired spatial orientation. A marking laser may provide a marking beam through a marking origin onto the adjacent second I-joist. The marking origin may be identical with an initial reference point with respect to which the initial cutout is fabricated.

The impinging point of the marking beam on the second I-joist may serve as reference point for cutting a second cutout into the second I-joist. Once the second cutout is fabricated, the marker beam may propagate further onto the third I-joist and so forth until a final cutout is accomplished at the final I-joist.

To adjust the marker beam with respect to a predetermined final reference point on the final I-joist, a second alignment laser may be utilized in combination with a target marker having a position indicator to be aligned with the final reference point. The target marker may be temporarily affixed such that a target center of it extends vertically from the final I-joist while the position indicator is at least aligned with the final reference point. The alignment laser is at least in vertical plane with the marking laser and in an vertical offset to the marking laser extending from the initial I-joist such that the alignment beam may propagate unimpeded across adjacent I-joists. The alignment laser may be adjusted to impinge upon the target center by means of which the marking laser is brought into desired orientation at least in vertical plane with the final reference point.

The laser marking device may be configured such that either the horizontal orientation and/or the vertical orientation of the alignment laser may be translated onto the marking laser. In case of vertically and horizontally coupled movements of alignment laser and marking laser, the target marker may feature an offset slider having a vertical offset between position indicator and target center that corresponds to the vertical offset between the origins of alignment beam and marking beam. The position indicator may be brought into coinciding position with the final reference point via the offset slider.

A marker fixture may hold the offset slider in position while the target center is targeted by the alignment laser. The spatial orientation of the alignment laser is transmitted onto the marking laser such that the serially fabricated cutouts may be precisely aligned between the marking origin and the final reference point.

The device's fixture may be either adjustable or replaceable to accommodate for varying configurations of the initial cutout. The device is simple to operate and provides a substantial improvement for precise fabrication of onsite cutouts into assembled I-joists.

DETAILED DESCRIPTION

Figure 1:
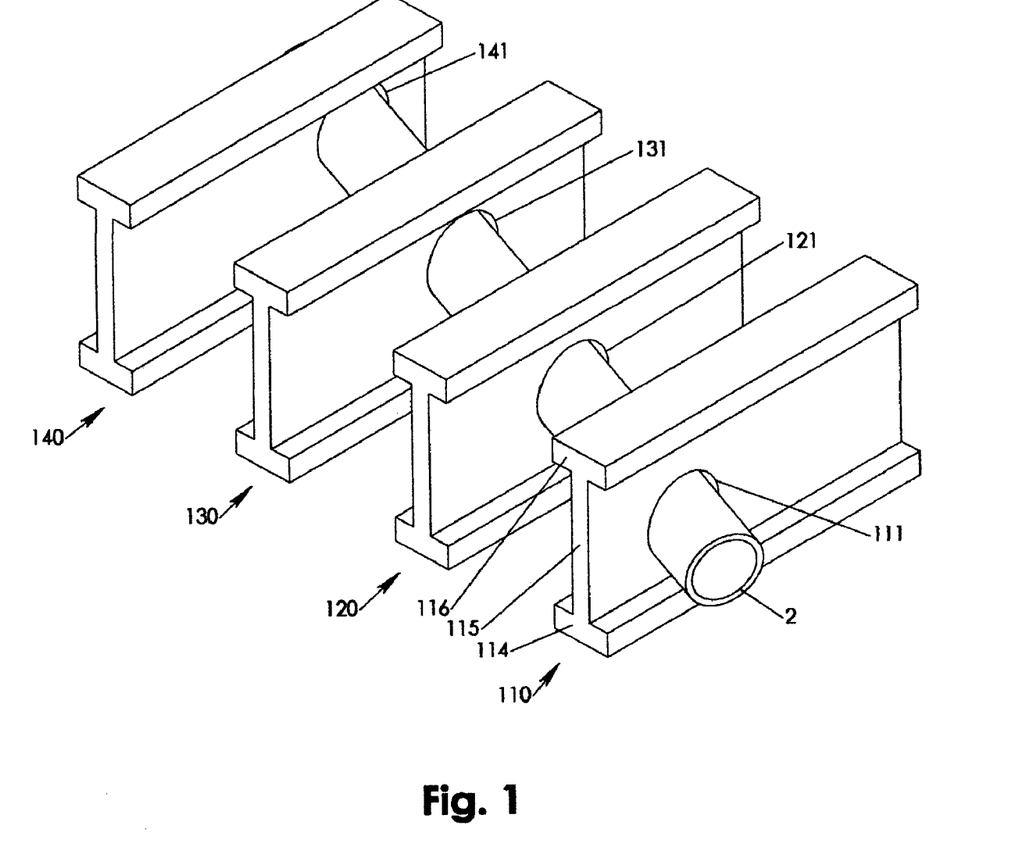
FIG. 1 shows a first perspective view of simplified I-joist portions with an across assembled profile.

Referring to FIG. 1, a profile 2 may be assembled in an architectural construction across a number of I-joists 110, 120, 130, 140 through their respective cutouts 111, 121, 131, 141. The cutouts 111, 121, 131, 141 may be fabricated at the construction site after installation of the I-joists 110, 120, 130, 140. Each of the I-joists 110, 120, 130, 140 may preferably have a bottom chord 114, a web 115 and a top chord 116. The cutouts 111, 121, 131, 141 are fabricated in a distinct spatial position relative to each other in compliance with the later on installed profile's 2 predetermined spatial position, cross section and orientation. The I-joists 110, 120, 130, 140 are preferably of wood and/or wood like material.

Figure 2:
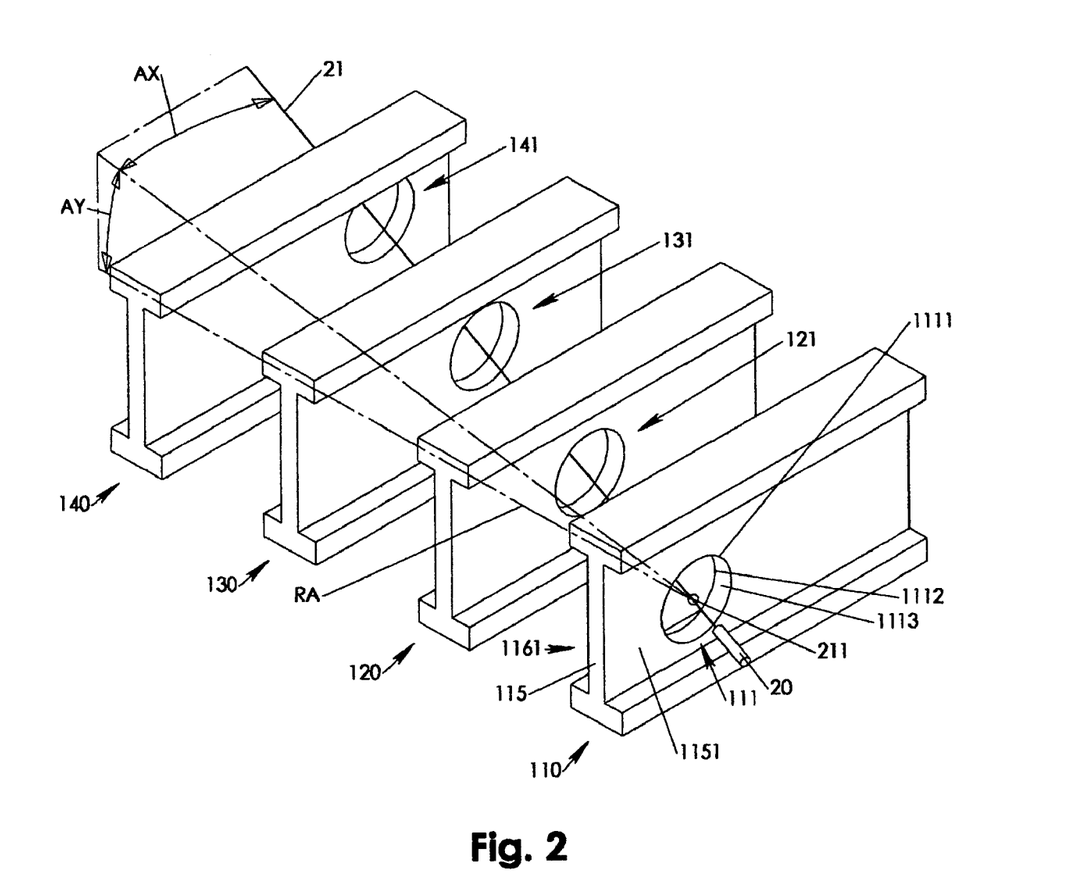
FIG. 2 shows the first perspective view of the I-joist portions of FIG. 1 without the profile and together with a marking laser.

Referring to FIG. 2, the distinct spatial positions of the cutouts 121, 131, 141, may be determined with respect to the initial cutout 111 by a marking laser 20 affixed at the initially fabricated cutout 111 such that the marking laser's 20 marking beam 21 coincides with a marking origin 211, which may coincide with an initial reference point of the initial cutout 111. In case the cutouts 111, 121, 131, 141 are circular, the initial reference point/marking origin 211 may be the center of the cutout 111 at the web front side 1151 at which the cutout 111 is fabricated into the web 115.

The marking laser 20 is also brought into a spatial orientation that is substantially parallel to the later installed profile's 2 assembly orientation. The marking beam's 21 impinging point at the adjacent I-joist 120 may illuminate the second cutout's 121 reference point for fabricating the second cutout 121. In that fashion, adjacent cutouts 121, 131, 141 may be progressively fabricated.

Circular cutouts may be fabricated with an I-joist hole cutting apparatus as described and claimed in the cross referenced patent. An I-joist hole cutting apparatus such as the cross referenced one, may feature a pilot drill for initially drilling into the web 115 at the illuminated spot to center the apparatus during the cutout operation.

The marking laser's 20 spatial orientation may be defined by a horizontal angle AX and a vertical angle AY with respect to a reference axis RA through the marking origin 211. The reference axis RA may be an axis horizontal in space and perpendicular to the I-joist's 110, 120, 130, 140 protrusion direction. Horizontal angle AX, vertical angle AY and reference axis RA are introduced solely for the purpose of general understanding of the invention. The marking method described under FIG. 2 may be accomplished by a laser marking device 60 as exemplarily described in reference to the FIGS. 5–8.

The cutouts 111, 121, 131, 141 may be fabricated with a cutting tool such as a hole saw or the cross referenced hole cutting apparatus. In that case, the initial cutout may have a front edge 1111, which is substantially free of any burr and a back edge 1121, which may have a burr or may be in otherwise discontinuously shaped and raising above the web's 115 back side 1161. The wall 1113 of the cutout 111 may be substantially symmetric with respect to the reference axis RA but eventually non cylindrical due to imperfect fabrication. These facts may be taken into account for temporarily affixing the marking devices 60, 70, 80, which are described in more detail under the FIGS. 5–11.

Figure 3:
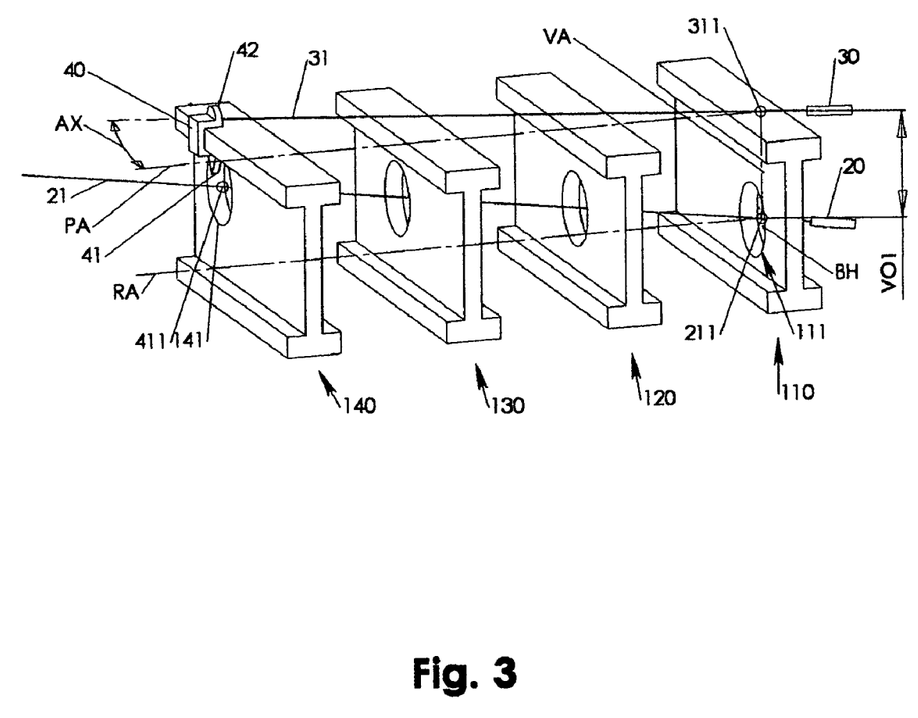
FIG. 3 shows a second perspective view onto the I-joist portions and marker laser of FIG. 2 with an additional alignment laser in substantially parallel orientation with respect to the I-joists' top chords.

As illustrated in FIG. 3, the orientation of the marking laser 20 along the horizontal angle AX may be assisted by a second aligning laser 30 positioned in a first vertical offset VO1 with respect to the alignment laser 20. The first vertical offset VO1 is selected such that its alignment beam 31 may propagate in a substantially parallel distance to the hoists 110, 120, 130, 140 unimpeded by the I-joists 110, 120, 130, 140.

The aligning laser 30 may be coupled with the marking laser 20 around a vertical axis VA such that rotation of the alignment laser 30 around the vertical axis VA is simultaneously performed by marking laser 20. The alignment beam 31 may coincide with the vertical axis VA in the alignment origin 311. The marking laser 20 may be additionally rotated around a bottom horizontal axis BH independently from the alignment laser 30. Vertical axis VA, horizontal axis BH and reference axis RA may coincide with the marking origin 211.

A horizontal target marker 40 may be temporarily affixed at the final I-joist 140 such that a position indicator 41 is in vertical alignment with a predetermined final reference point 411. A marker target 42 may extend away from the final I-joist 140 in vertical alignment with the position indicator 41. The marker target 42 may feature a target center 43 (see FIG. 9) onto which the alignment beam 31 may be directed. Corresponding to the alignment laser 30, the horizontally rotationally coupled marking laser 20 may have the same horizontal orientation. In that fashion, the marking beam 21 is vertically in plane with the position indicator 41 and precisely horizontally positioned with respect to the predetermined final reference point 411. The marking method described under FIG. 3 may be accomplished by a laser marking device 70 in combination with the horizontal target marker 40 as exemplarily described in reference to the FIG. 9.

Figure 4:
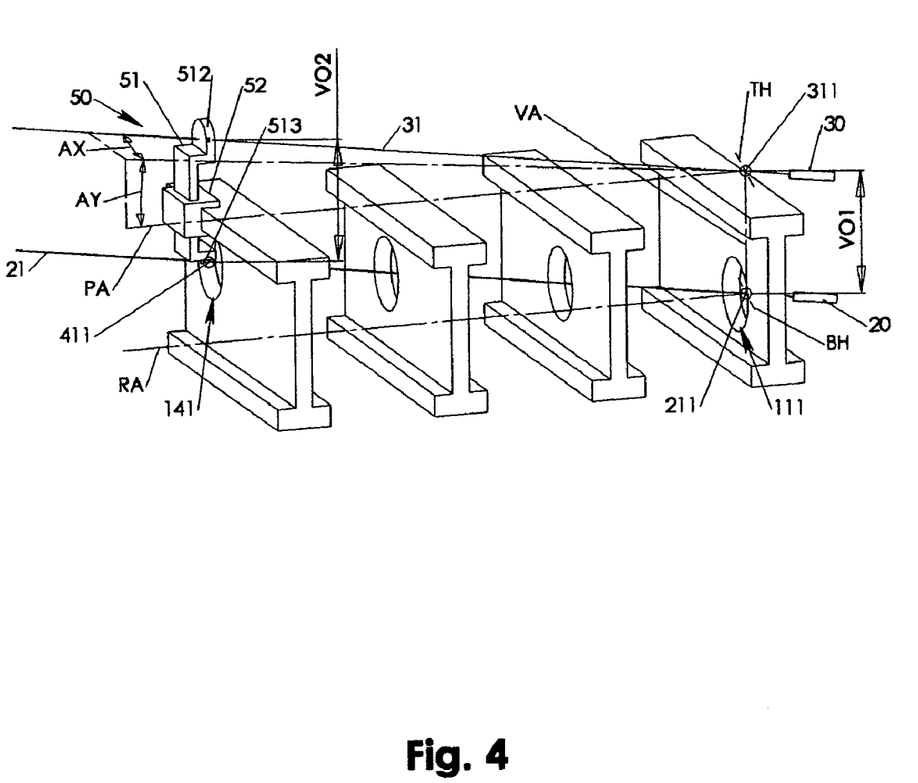
FIG. 4 shows the second perspective view onto the I-joist portions and marker laser of FIG. 2 with an additional alignment laser in substantially parallel orientation with respect to the marking laser.
Figure 5:
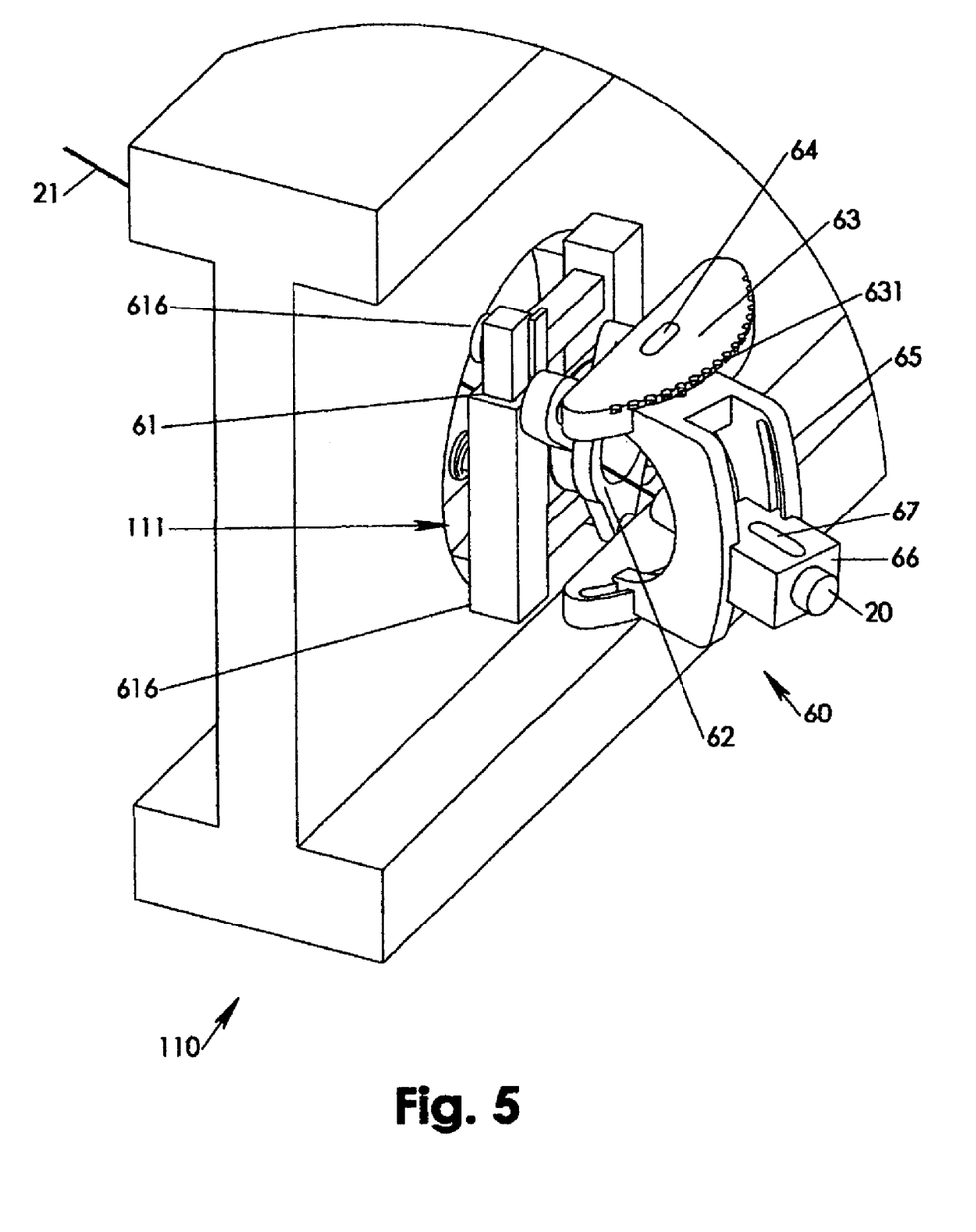
FIG. 5 shows a first perspective detail view onto the first I-joist portion together with a first exemplary embodiment of a laser marking device.
Figure 6:
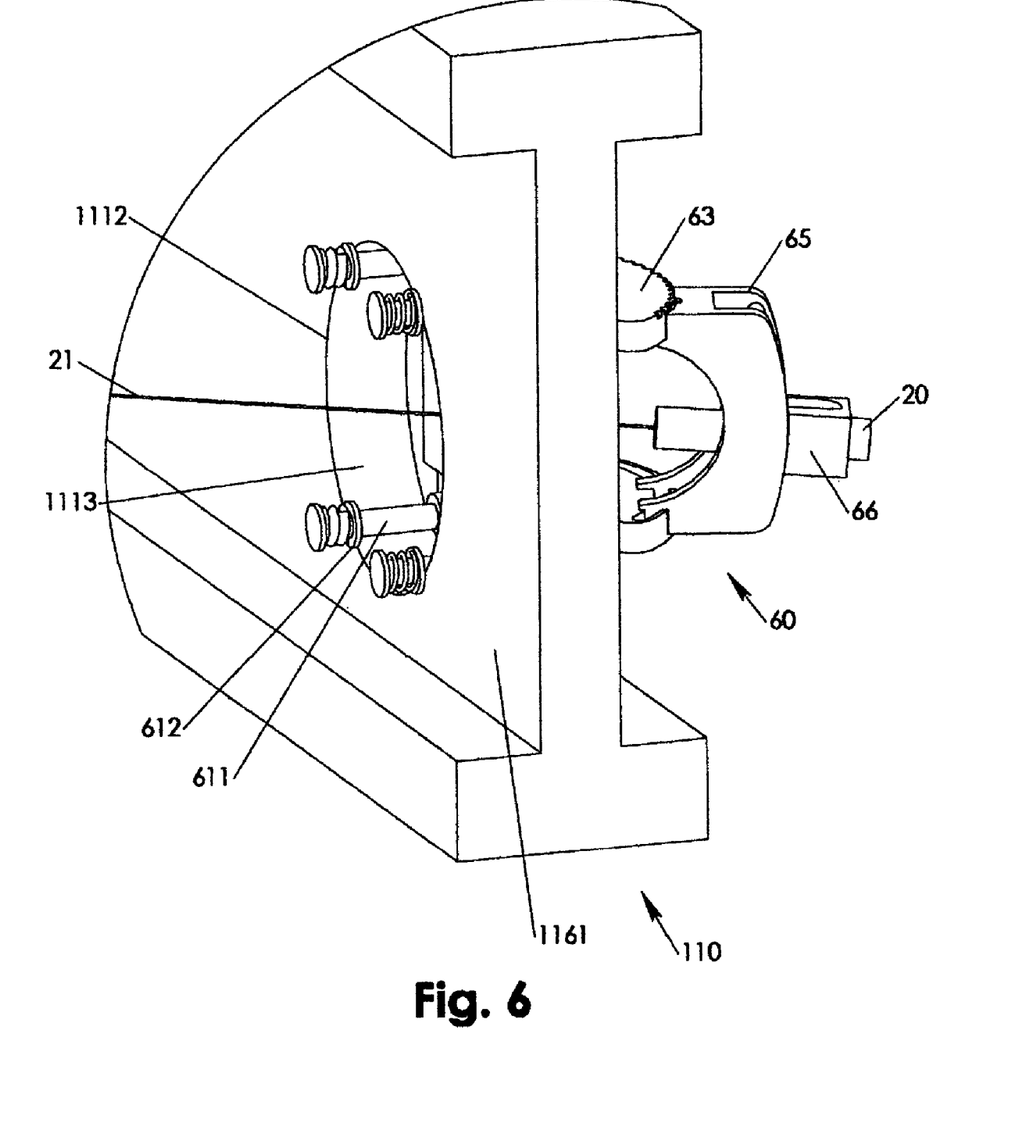
FIG. 6 shows a second perspective detail view onto the first I-joist portion together with the first exemplary embodiment of the laser marking device.
Figure 7:
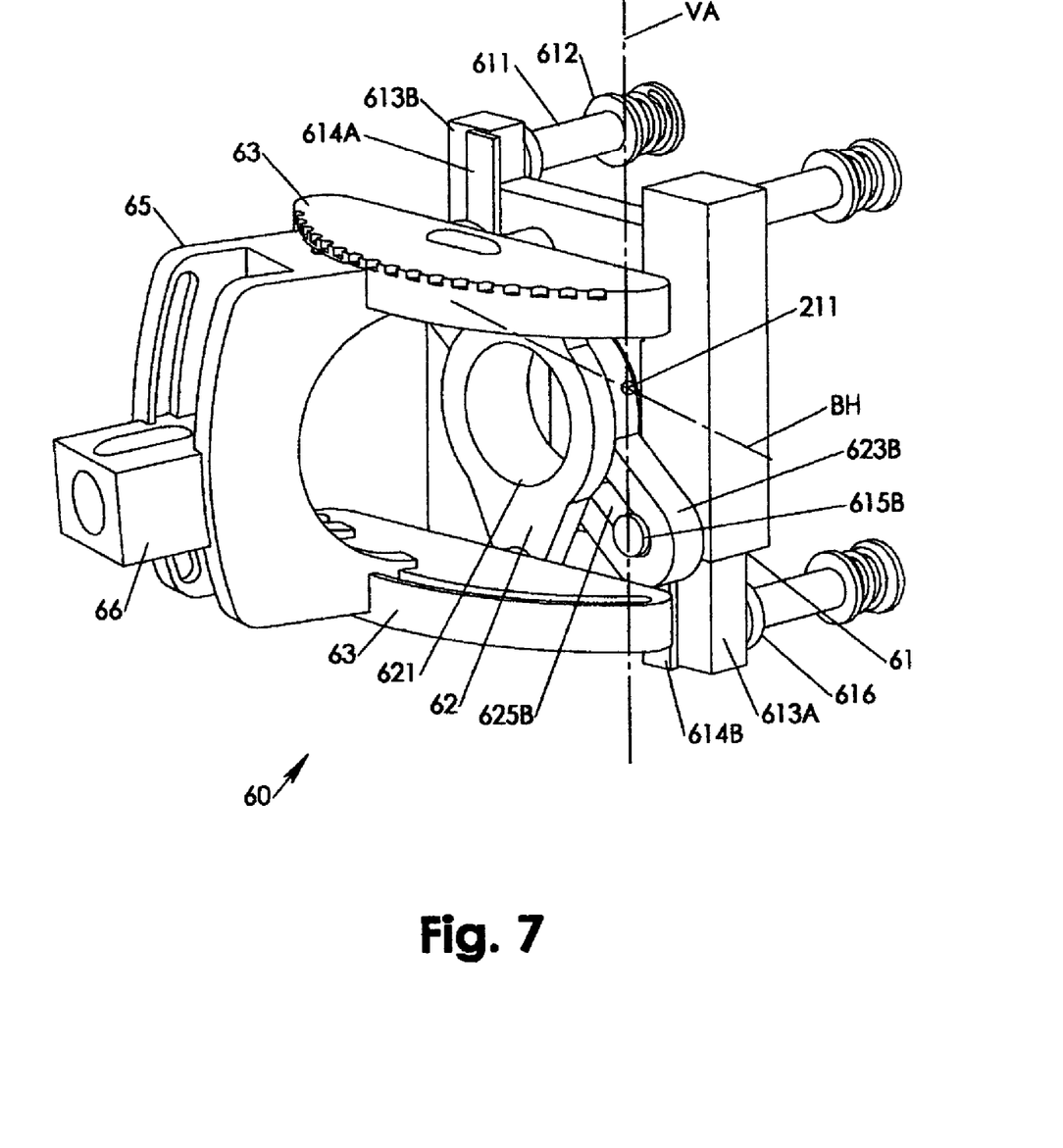
FIG. 7 shows a third perspective view of the first exemplary embodiment of the laser marking device without marking laser.
Figure 8:
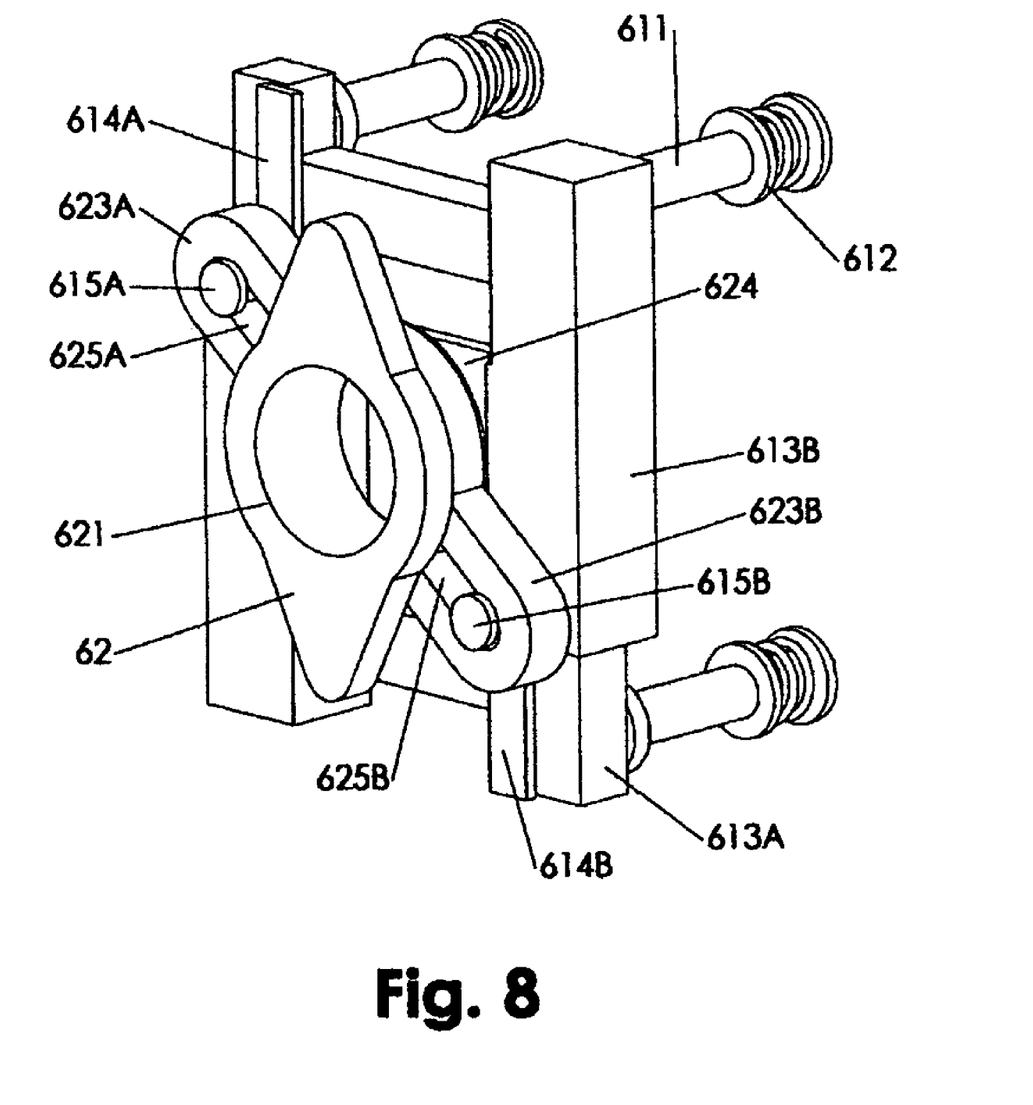
FIG. 8 shows a third perspective view of the first exemplary embodiment of the laser marking device without angle gages.

Referring to FIG. 4, the alignment laser 30 and marking laser 20 may be coupled such that a vertical rotation of the alignment laser 30 may be directly transmitted onto the marking laser 20. As a result, a vertical angle AY of the alignment beam 31 may be simultaneously executed by the marking beam 21. Horizontal laser rotation coupling may be combined with vertical laser rotation coupling such that a precise spatial orientation of the marking beam 21 may be obtained with respect to a predetermined final reference point 411. An offset target marker 50 may be employed, which operates similar to the horizontal target marker with the additional feature of providing the slider target 512 with its target center 514 (see FIG. 10) and the position indicator 513 with a second vertical offset VO2 on a slider 51. First and second vertical offsets VO1, VO2 are preferably substantially equal. The offset slider 51 is slide ably held in a marker fixture 52, which serves to temporarily affix the offset target marker on the final I-joist 140 with the slider target 512 and the position indicator 513 being along a line parallel to the vertical axis VA.

The offset target marker 50 may be affixed on the final I-joist 140 and the offset slider 51 may be adjusted with respect to the marker fixture 52 such that the position indicator 513 substantially coincides with the final reference point 411. Once the alignment beam 31 is directed onto the target center 514, the marker beam 21 may be in a spatial orientation such that it would coincide with the final reference point 411 if all cutouts would already be cut into the I-joists 110, 120, 130, 140.

The alignment laser 30 may rotate together with the marking laser 20 around the horizontal bottom axis BH or may rotate around its own horizontal top axis TH, which may be parallel to the bottom axis BH. The use of two distinct horizontal axes BH and TH for their respective lasers 20, 30 provides for constant first vertical offset VO1 of the two beams 21, 31 irrespective the vertical angle AY, and consequently provides for the most precise vertical adjustment of the marking beam 31. The marking method described under FIG. 4 may be accomplished by a laser marking device 80 in combination with the offset target marker 50 as exemplarily described in reference to the FIGS. 10, 11.

Referring to FIGS. 5–8, a laser marking device 60 according to a first embodiment includes an adjustable fixture 61 connected with a centering feature 62, which in turn holds a marking laser holder 66 via a horizontal angle gage 63 and a vertical angle gage 65. The adjustable fixture 61 has at least two spring loaded and oppositely expanding structures 613A, 613B each of which independently combined with a number of wall stops 611. As a result, the wall stops 611 are laterally forced against the cutout wall 1113 once the laser marking device 60 is inserted and released in the initial cutout 111.

The adjustable fixture 61 may additionally feature spring loaded counter stops 612 that press resiliently against the web back side 1161 while compensating for eventual burrs and other structural inconsistencies stemming from an imperfect cutting of the initial cutout 111. The forced contact between counter stops 612 and the web back side 1161 pulls the fixture 61 with the front stops 616 towards the web front side 1151. The web front side 1151 may be free of unevenness along the cutout front edge 1111 in case the initial cutout 111 is abrasively fabricated in direction from the web front side 1151 towards the web back side 1161.

The spring loaded contacting of the adjustable fixture 61 in axial and radial direction of the initial contact 111 provides for a distinct positioning of the adjustable fixture 61 in axial and radial direction with respect to the reference axis RA. A centering feature 62 provides for a centered positioning of the angle gages 62, 63 irrespective of the diameter of the initial cutout 111 and the radial expansion of the structures 613A, 613B. For that purpose, the centering feature may have link arms 623A, 623B that engage slide ably and rotationally free via link guides 625A, 625B with link pins 615A, 615B, which are part of their respective structures 613A, 613B.

The link arms 623A, 623B are structurally combined and are at their center rotationally freely connected to a parallel slider 624 that is also part of the centering feature 62. The parallel slider 624 slides between alignment guides 614A, 614B that are part of their respective structures 613A, 613B. The free sliding of the parallel slider 624 combined with a rotation equally transposed via the link pins 615A, 615B onto the link arms 623A, 623B provides for a centered position of the centering feature relative to the structures 613A, 613B irrespective of an expansion distance between the structures 613A, 613B. In addition, the centering feature 62 remains substantially parallel to the structures 613A, 613B.

The laser marking device 60 may further include a horizontal bubble level 64 for horizontally adjusting the laser marking device 60 within the initial cutout 111. The centering feature 62 may have a laser channel 621 for uninterrupted propagation of the marking beam 21 through the laser marking device 60 and through the initial cutout 111.

The horizontal gage 63 may feature an angle scale 631. The marking laser holder 66 may feature a vertical angle bubble level 67 to setup the marking laser 20 with a predetermined vertical angle AY. The horizontal angle gage 63 provides for a rotational positioning of the marking laser 20 around the vertical axis VA. The vertical angle gage 65 provides for a rotational positioning of the marking laser 20 around the bottom horizontal axis BH. Horizontal angle gage 63 and vertical angle gage 65 may be interchangeable in manner by which they are connected with each other and with the centering feature 62 as may be well appreciated by anyone skilled in the art. Vertical axis VA and horizontal bottom axis BH are positioned with respect to the adjustable fixture 61, such that both the vertical axis VA and the horizontal bottom axis BH substantially coincide with the marking origin 211 while the laser marking device 60 is affixed at the initial cutout 111.

Figure 9:
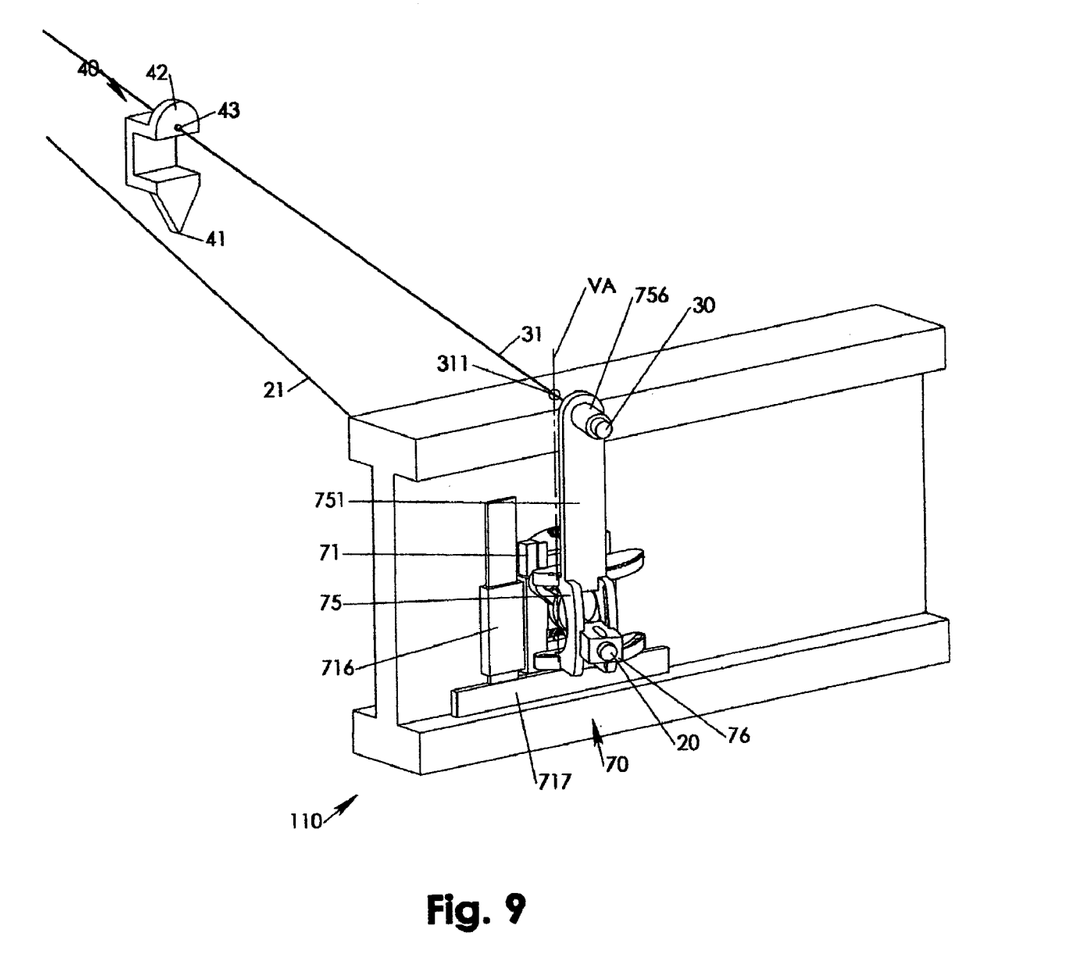
FIG. 9 shows a fourth perspective view onto the first I-joist portion together with a first exemplary embodiment of a target marker and a second exemplary embodiment of the laser marking device.

Referring to FIG. 9, a laser marking device 70 according to a second embodiment of the invention is similar to the laser marking device 60 except that the laser marking device 70 additionally provides a holder 756 for the alignment laser 30. The alignment laser holder 756 is connected via an offset arm 751 to the vertical gage 75 such that both lasers 20, 30 are structurally coupled in their rotational movement around the vertical axis VA.

Alternatively, the offset arm 751 may be directly and only connected with the marking laser holder 76, which may couple both lasers 20, 30 in both their horizontal and vertical movements. In such case, the alignment beam 31 may coincide only with the vertical axis VA but not with the alignment origin 311, which may be negligible where vertical angle AY is only within a view degrees.

The laser marking device 70 differs from the laser marking device in as much as the laser marking device 70 may feature an level angle 717 guided in an angle guide 716 that is part of the fixture 71. The level angle 717 may provide vertical positioning of the laser marking device 70 with respect to the I-joist's 110 protrusion direction. Once the fixture 71 is inserted in the initial cutout 111, the level angle 717 may be moved within the angle guide 716 towards one of the bottom chord 114 or the top chord 116 and the fixture 71 may be rotated such that the level angle 717 snugly contacts the respective chord 114 or 116.

Figure 10:
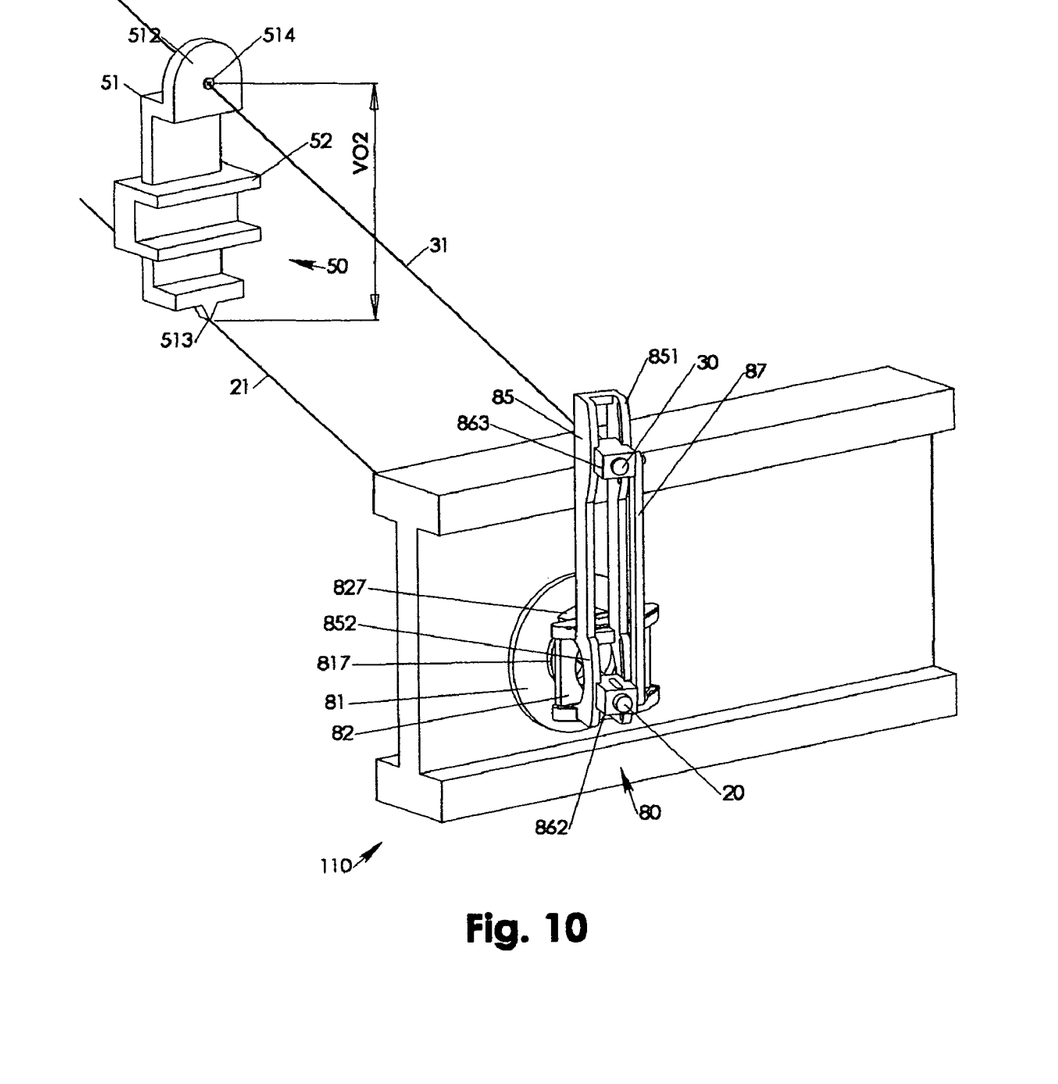
FIG. 10 shows a fourth perspective view onto the first I-joist portion together with a second exemplary embodiment of a target marker and a third exemplary embodiment of the laser marking device.
Figure 11:
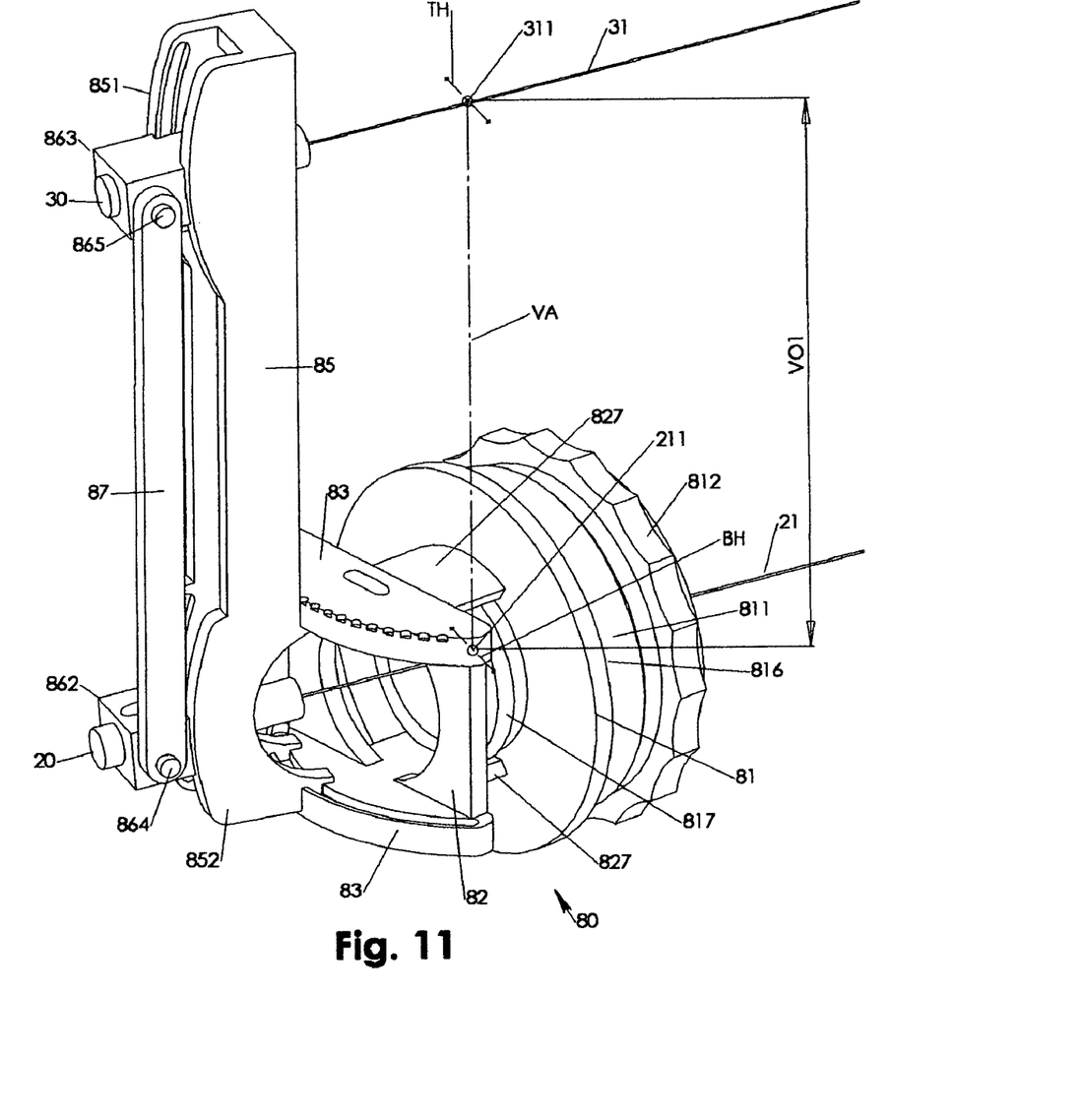
FIG. 11 shows the third perspective view of the third exemplary embodiment of the laser marking device.

Referring to FIGS. 10–11, a laser marking device 80 according to a third embodiment of the invention includes an alignment laser holder 863 rotationally guided in a vertical alignment gage 851 and pivoting around a top horizontal axis TH that substantially intersects with the vertical axis VA at the alignment origin 311. The vertical alignment gage 851 is together with the vertical marking gage 852 part of a rigid dual gage body 85 that is rotationally guided by the horizontal angle gage 83 and pivoting around the vertical axis VA. The separate vertical rotations of alignment laser holder 863 and marking laser holder 862 is synchronized via connecting rod 87 hinging on a top rod pin 865 of the alignment laser holder 863 and hinging on a bottom rod pin 864 of the marking laser holder 862. As a result, the first vertical offset VO1 of marking beam 21 and alignment beam 31 remains substantially constant irrespective the vertical angle AY.

The third embodiment exemplarily demonstrates a configuration of the laser marking device 80 in which the fixture 81 is fabricated to fit with close tolerance into the initial cutout 111. The fixture 81 may feature a wall fit 811 that corresponds to the cutout wall 1113 and provides a substantially snug fit when inserted in the initial cutout 111. A web front stop 816 may be a simple shoulder in an outward offset to the wall fit 811. A counter stop 812 may be in the form of a removable thread ring threaded onto a thread portion of the fixture 81 extending beyond the web back side 1161. The fixture 81 is temporarily affixed by sandwiching the web portion surrounding the initial cutout 111 in between the web front stop 816 and the counter stop 812.

To adjust the laser marking device 80 to varying contour shapes and/or diameters of the initial cutout 111, the fixture 81 may be exchangeable for example by means of a fixture's 81 snap shoulder 817 engaging with snap features 827 of the central body 82. The snap shoulder 817 may be of circular shape and concentrically arranged with respect to an eventually rotationally symmetric wall fit 811 and/or with respect to the marking origin 211. As a result, the fixture 81 may be tightly secured in the initial cutout 111 and vertical axis VA properly adjusted by rotating the central body 82 with the snap features 827 around the snap shoulder 817. Fixture 81 and central body 82 feature central material separations for an uninhibited propagation of marking beam 21.

Described elements such as bubble levels 64, 67, and level angle 717 as well as particular configurations of the individual embodiments involving the exchangeable fixture 81 or the adjustable fixture 61 may be exchanged and complemented by well known equivalent structures as long as the function of the laser marking devices 60, 70, 80 is warranted as described.

As may be clear to anybody skilled in the art from the FIGS. 1–11 and the teachings presented above, the angle gages 63, 65, 83, 852 provide for a coinciding of the marker beam 21 with the marking origin 211 irrespective the marker beam's 21 horizontal and/or vertical orientation. The invention may include also embodiments in which the marker beam 21 and the alignment beam 31 propagate away from the first I-joist 110. In such embodiments, the laser marking device 60, 70, 80 may be affixed on a side of the first I-joist 110 facing the second I-joist 120. Such embodiments may be advantageous for designing above described elements of the laser marking device 60, 70, 80 without need for providing space for an uninhibited propagation of the marker beam 21.

A number of serial cutouts 111, 121, 131, 141 may be fabricated by the laser marking device 60, 70, 80 by determining an initial reference point 121 and fabricating the initial cutout 121 into the first I-joist 110. In a following step, the laser marking device 60 is inserted in the initial cutout 121, vertically oriented by use of the horizontal bubble level 64 or by use of the level angle 717. In a next step the laser marking device 60, 70, 80 may be centered and affixed by either releasing the radially expandable structures 613A, 613B together with the spring loaded counter stops 612 or by fixing the cutout fit fixture 81 via the counter stop 812.

In case of the laser marking device 60, a horizontal angle AX may be selected by use of the angle scale 631 and a vertical angle AY may be selected by use of the angle bubble level 67. After activation of the marking laser 20, the substantially linear marking beam 21 impinges on the second I-joist 120 and creates an illuminated spot that may serve as a reference point for fabricating the second cutout 121. After completion of the second cutout 121, the marking beam 21 may propagate through the second cutout 121 and impinge on the third I-joist 130. In that manner, all cutouts 121–141 may be fabricated.

In case of the laser marking device 70, a final reference point 411 may be determined on the final I-joist 140. The horizontal target marker 40 may be affixed on the final I-joist 140 such that the position indicator 41 is vertically aligned with the final reference point 411 and the marking laser 20 is horizontally oriented by targeting the alignment beam 31 on the target center 43. The horizontal target marker 40 may have a U-shaped body to snap on a cord and be temporarily affixed of the final I-joist 140.

In case of the laser marking device 80, a final reference point 411 may be determined on the final I-joist 140. The offset target marker 50 may be affixed on the final I-joist 140 and the offset slider 51 vertically adjusted such that the slider position indicator 513 coincides with the final reference point 411. The marking laser 20 is horizontally and vertically oriented by targeting the alignment beam 31 on the slider target center 514. The marker fixture 52 may be U-shaped to snap on a cord and be temporarily affixed of the final I-joist 140.

In context with the present invention, the final reference point 411 and the final I-joist 140 may be any reference point along on any I-joist suitable for determining a spatial orientation of the reference axis RA. There may be other I-joists following the final I-joist 140 in which cutouts may be fabricated in accordance with the teachings above.

Accordingly, the scope of the invention described in the specification above is set forth by the following claims and their legal equivalent:

What is claimed is:

1. A method for serially fabricating cutouts into a number of adjacent assembled I-joists, said method comprising the steps of:
    a. determining an initial reference point and fabricating an initial cutout into a first of said I-joists;
    b. vertically orienting, centering and affixing a laser marking device at said initial cutout such that a laser marking beam of said marking device substantially coincides with said marking origin;
    c. determining a final reference point on a final of said I-joist;
    d. at least vertically aligning a position indicator of a target marker with said final reference point on said final I-joist such that a target center of said target marker in a first vertical offset to said position indicator extends vertically from said final I-joist;
    e. affixing said target marker on said final I-joist;
    f. angularly orienting said marking laser such that an illuminated spot is provided on a second of said I-joists while said marking beam coincides with said marking origin;
    g. Fabricating a second cutout at said second I-joist with repect to said illuminated spot, such theat said marking beam may propagate through said second cutout and impinge on a third of said I-joists for fabricating a third cutout into said third I-joist;
    whereby said angular orienting of said marking laser of step f) is provided in horizontal direction by an alignment beam centered onto said target center adjacent and across said I-joists; and
    whereby said alignment beam is in a second vertical offset to said marker beam and at least vertically in plane with said marker beam such that said marker beam is at least vertically in plane with said position indicator after said targeting of said alignment laser onto said target center.

2. The method of claim 1,
    whereby said first vertical offset and said second vertical offset are substantially equal;
    whereby said position indicator is vertically slide able coupled with said target center and coincident aligned with said final reference point; and whereby said alignment beam and said marker beam are vertically coupled tilt able such that said angular orienting of said marking laser of step f) is provided in vertical direction and such that said marker beam substantially coincides with said position indicator while said alignment beam is said centered on said target center.

3. A laser marking device for serially fabricating cutouts into a number of adjacent assembled I-joists, said device comrrising:
   a. a marking laser providing a marking beam;
   b. a fixture for removable attaching said device at an initial of said cutouts with respect to a marking origin of said initial cutout;
   c. an angle gage angularly adjustable holding said marking laser with respect to said fixture such that said marking beam substantially coincides with said marking origin irrespective an angular orientation of said marking laser;
   d. at least two radially expandable structures for affixing said fixture at said initial cutout;
   e. a centering feature for centering said laser marking device in said initial cutout, said centering feature having:
      i. a parallel slider sliding along an alignment guide being part of at least one of said expandable structures; and
      ii. two link arms each slide ably engaging with one of at least two corresponding link pins, each of said link pins being part of one of said expandable structures, said two link arms being structurally combined and at their center rotationally freely connected to said parallel slider such that a rotation equally transposed via said link pins onto said link arms provides for a centered position of the centering feature relative to said radially expandable structures irrespective of an expansion distance between said radially expandable structures and such that said centering feature remains substantially parallel to said radially expandable structures.

4. The laser marking device of claim 3, wherein said angle gage is a horizontal angle gage and wherein said horizontal angle gage holds an alignment laser in a first vertical offset to said marking laser, and wherein said laser marking device further includes a horizontal target marker for being temporarily affixed on a final I-joist, said horizontal target marker being configured such that while said horizontal target marker is said temporarily affixed, a position indicator of said target marker is facing a web portion of said final I-joist and a target center of said horizontal target marker extends above said final I-joist accessible by said alignment laser across said assembled I-joists.

5. The laser marking device of claim 3, wherein said angle gage is a vertical angle gage and wherein said vertical angle gage holds an alignment laser in a first vertical offset to said marking laser, and wherein said laser marking device further includes an offset target marker for being temporarily affixed on a final I-joist, said offset target marker having an vertically slide able offset slider and being configured such that while said offset target marker is said temporarily affixed, a position indicator of said offset slider is facing a web portion of said final I-joist and a target center of said offset slider extends above said final I-joist accessible by said alignment laser across said assembled I-joists, and wherein said position indicator is in a second offset to said target center, said second offset being substantially equal to said first vertical offset.

6. The laser marking device of claim 5, wherein said marking laser is tilt able around a horizontal bottom axis and said alignment laser is tilt able around a horizontal top axis being in said first vertical offset to said horizontal bottom axis, and wherein said marking laser and said alignment laser are coupled such that an angular displacement of said alignment laser results in a substantially equal angular displacement of said marking laser.

* * * * *